United States Patent
Ligon, Sr. et al.

[11] Patent Number: 5,984,407
[45] Date of Patent: Nov. 16, 1999

[54] CABLE ATTACHMENT FOR A LUMBAR SUPPORT

[75] Inventors: James T. Ligon, Sr., Almont; Stephen P. Porter, Imlay City, both of Mich.

[73] Assignee: McCord Winn Textron Inc., Manchester, N.H.

[21] Appl. No.: 08/815,374

[22] Filed: Mar. 10, 1997

Related U.S. Application Data

[63] Continuation-in-part of application No. 08/606,257, Feb. 23, 1996, Pat. No. 5,609,394.

[51] Int. Cl.$^6$ .................................................. A47C 3/025
[52] U.S. Cl. ..................................... 297/284.4; 297/284.1
[58] Field of Search .............................. 297/284.1, 284.4, 297/284.7, 284.8, 452.3

[56] References Cited

U.S. PATENT DOCUMENTS

| | | |
|---|---|---|
| 4,153,293 | 5/1979 | Sheldon . |
| 4,316,631 | 2/1982 | Lenz et al. . |
| 4,354,709 | 10/1982 | Schuster . |
| 4,880,271 | 11/1989 | Graves . |
| 5,050,930 | 9/1991 | Schuster et al. . |
| 5,197,780 | 3/1993 | Coughlin . |
| 5,217,278 | 6/1993 | Harrison et al. . |
| 5,397,164 | 3/1995 | Schuster et al. . |
| 5,498,063 | 3/1996 | Schuster et al. . |
| 5,609,394 | 3/1997 | Ligon, Sr. et al. . |
| 5,651,583 | 7/1997 | Klinger et al. . |
| 5,791,733 | 8/1998 | Van Hekken et al . |

FOREIGN PATENT DOCUMENTS

| | | |
|---|---|---|
| 702522 | 3/1997 | European Pat. Off. . |
| 2013487 | 8/1979 | United Kingdom . |

*Primary Examiner*—Milton Nelson, Jr.
*Attorney, Agent, or Firm*—Dykema Gossett PLLC

[57] ABSTRACT

An adjustable lumbar support mechanism includes a flexible support member, a cushioning yoke, and a cable assembly. The flexible support member has oppositely disposed first and second longitudinal ends. The cushioning yoke has a first end attached to the flexible support member proximate to the first longitudinal end of the flexible support member. The cushioning yoke extends to its second end which is disposed between the first end of the cushioning yoke and the second end of the flexible support member. The yoke has a plurality of undulations disposed between the yokes first end and second end. The cable assembly has a sleeve and a cable slidably disposed therein. The sleeve has a first end attached to one of the second end of the cushioning yoke and the second end of the flexible support member. A first end of the cable is attached to the other of the second end of the cushioning yoke and the second end of the flexible support member.

7 Claims, 10 Drawing Sheets

CABLE ATTACHMENT FOR A LUMBAR SUPPORT

This application is a continuation in part of U.S. patent application Ser. No. 08/606,257, filed on Feb. 23, 1996, and issuing as U.S. Pat. No. 5,609,394 on Mar. 11, 1997.

FIELD OF THE INVENTION

The present invention relates to lower back or lumbar supports for seats, and more particularly to adjustable lumbar supports used in seatbacks.

BACKGROUND OF THE INVENTION

Lumbar supports employing cables as a means of adjusting the lumbar support commonly attach the cable directly to the flexible support member. This places a high level of stress on the flexible support member at the location of the cable attachment, particularly when the lumbar support is subjected to an impact load.

It is desired to provide a lumbar support employing a cable operated adjustment mechanism in which the connection of the cable to the flexible support induces a relatively low magnitude of stress in the flexible support member.

SUMMARY OF THE INVENTION

An adjustable lumbar support mechanism includes a flexible support member, a cushioning yoke, and a cable assembly. The flexible support member has oppositely disposed first and second longitudinal ends. The cushioning yoke has a first end attached to the flexible support member proximate to the first longitudinal end of the flexible support member. The cushioning yoke extends to its second end which is disposed between the first end of the cushioning yoke and the second end of the flexible support member. The yoke has a plurality of undulations disposed between the yokes first end and second end. The cable assembly has a sleeve and a cable slidably disposed therein. The sleeve has a first end attached to one of the second end of the cushioning yoke and the second end of the flexible support member. A first end of the cable is attached to the other of the second end of the cushioning yoke and the second end of the flexible support member.

An alternative adjustable lumbar support mechanism includes a flexible support member and a cable assembly. The flexible support member has oppositely disposed first and second longitudinal ends. The first longitudinal end has clamping features adapted to rotatably attach the first longitudinal end to a first horizontally disposed bar. The second longitudinal end is adapted to be slidably connected to a second horizontal disposed bar. The cable assembly has a sleeve and a cable slidably disposed therein. A first end of the cable has a hook fixed thereto, the hook being adapted to engage the first bar. The sleeve has a first end connected to the second end of the flexible support member. Displacement of the cable within the sleeve causes the flexible support to arch responsively thereto.

These and other features of the present invention will become apparent to one skilled in the art from the following detailed description and the appended drawings.

DETAILED DESCRIPTION OF A PREFERRED EMBODIMENT

Figure 1:
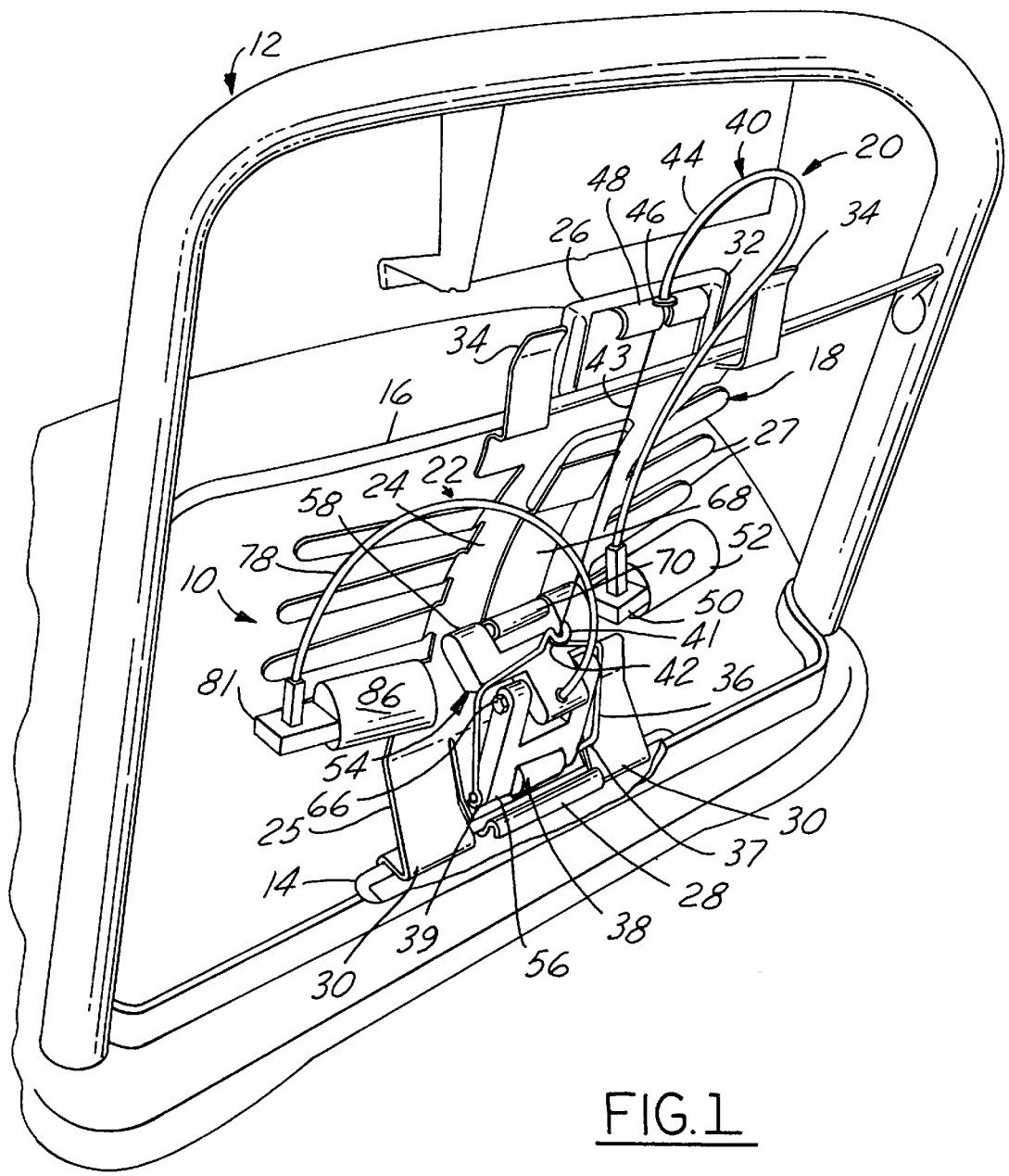
FIG. 1 is a perspective view of a four-way lumbar support in a seatback frame.
Figure 2:
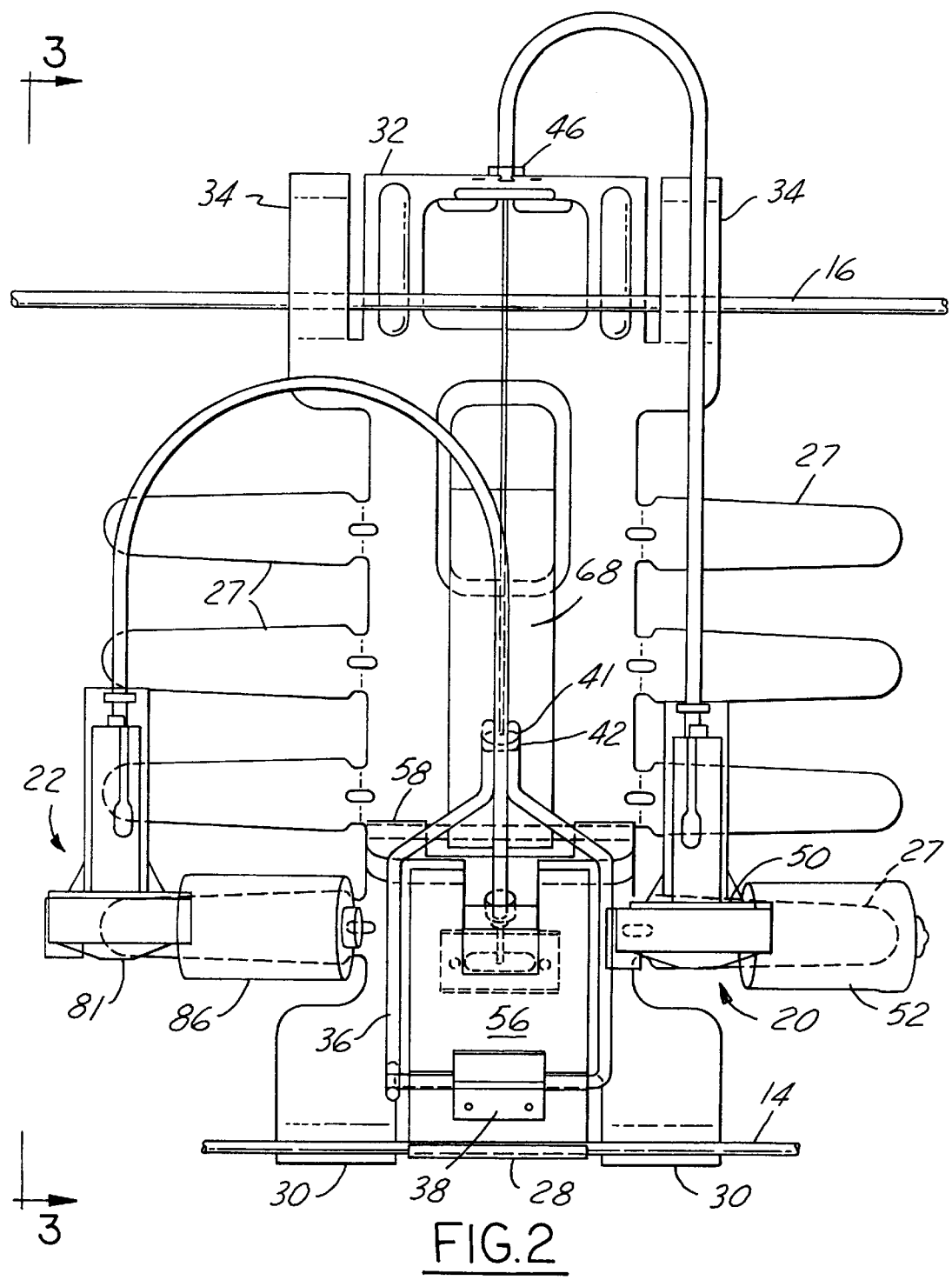
FIG. 2 is a rear view of the four-way lumbar support and seatback frame of FIG. 1.

A four-way lumbar support 10 as shown in FIGS. 1 and 2 is supported by a seatback frame 12 having a first or lower horizontally disposed bar 14 and a second or upper horizontally disposed bar 16 engaging opposite ends of four-way lumbar support 10. A flexible single piece support member 18 is engaged by means for longitudinally subtending 20 and an apex shift mechanism 22.

The single piece support member 18 has a central body 24 with a first or lower longitudinal end 25 pivotably attached to first horizontally disposed bar 14, and a second longitudinal end 26 slidably engaging second horizontally disposed bar 16. Four support fingers 27 extend transversely outwardly from each side of central body 24. Of course support member 18 may have more or fewer support fingers 27 depending upon the specific seat configuration. First longitudinal end 25 includes an inside clamping member 28 and outside clamping member 30, best shown in FIGS. 2 and 3. Inside clamping member 28 and outside clamping member 30 deflect from a first position, shown in phantom in FIG. 3, to receive first horizontally disposed bar 14 and deflect to the second position, shown in solid lines, trapping bar 14 and thereby providing pivotable engagement between first longitudinal end 25 and first horizontally disposed bar 14.

Figure 3:
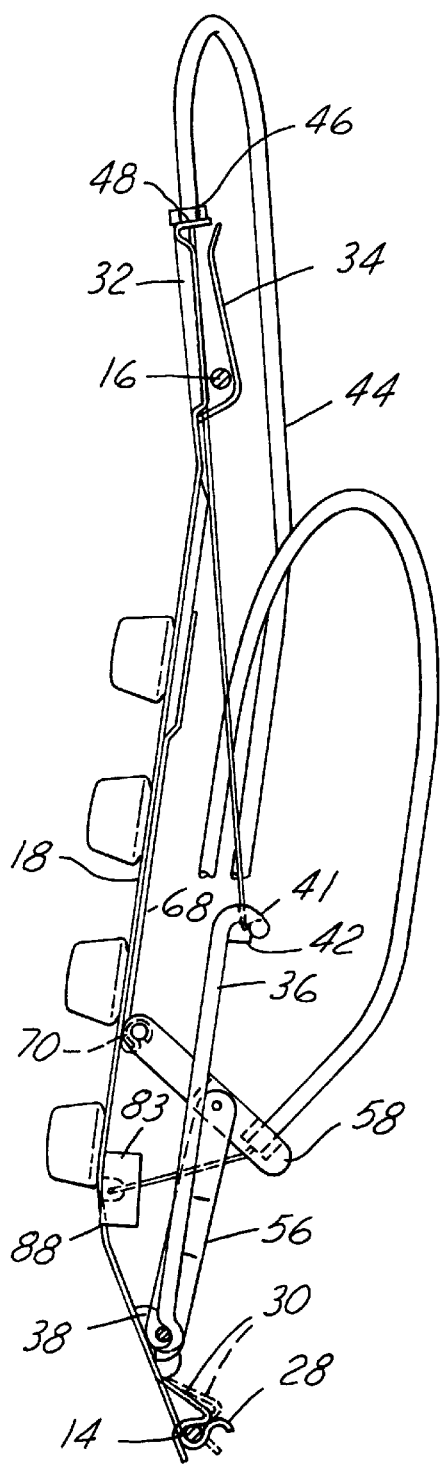
FIG. 3 is a side view of the four-way lumbar support of FIG. 1 adjusted to provide minimal lumbar support.
Figure 4:
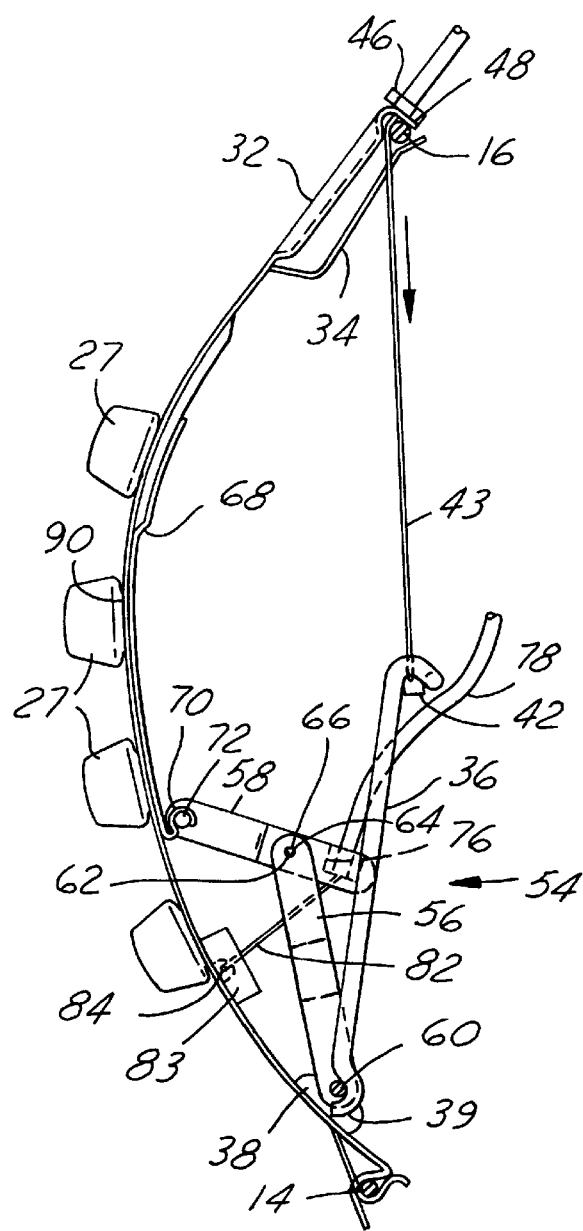
FIG. 4 is a side view of the four-way lumbar support of FIG. 1 adjusted to provide maximum lumbar support at a first or lowest apex vertical position.
Figure 5:
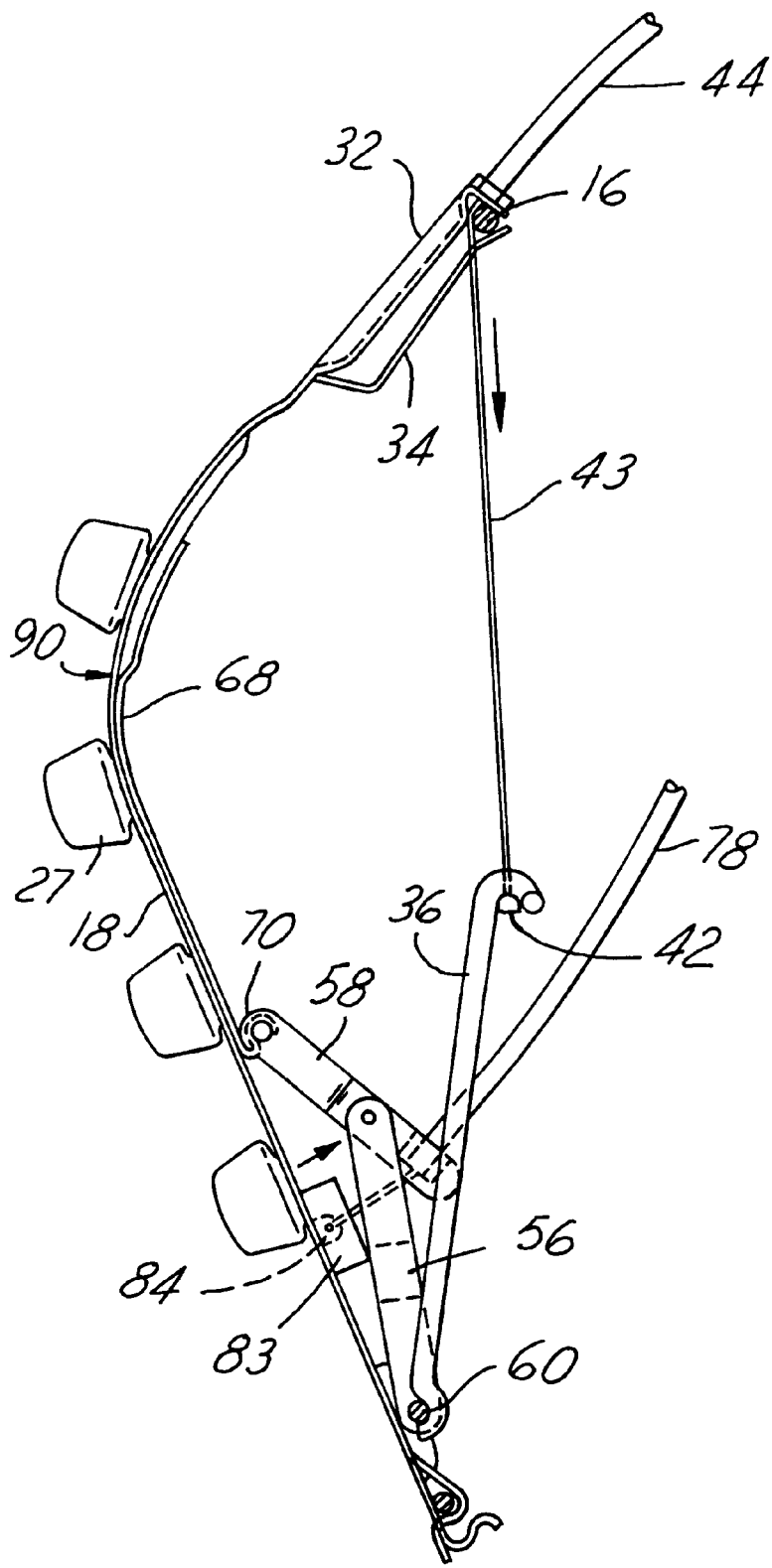
FIG. 5 is a side view of the four-way lumbar support of FIG. 1 adjusted to provide maximum lumbar support with the apex adjusted to a second or maximum vertical position.

Second longitudinal end 26 has inside holding member 32 and outside holding members 34 engaging second horizontally disposed bar 16. Inside holding member 32 and outside holding members 34 are spaced apart from each other as shown in FIGS. 3–5 a distance approximately equal to a diameter of second horizontally disposed bar 16, enabling sliding movement of second longitudinal end 26 relative to second horizontally disposed bar 16 a distance approximately equal to the length of outside holding member 34.

A subtending yoke 36 has a lower side 37 passing through an aperture in a bottom anchor 38 which is fixed to inside clamping member 28, thereby pivotably attaching yoke 36 to support member 18. Subtending yoke 36 has an engaging hook 39 on one side which engages a free end of lower side 37 to enable both sides of yoke 36 to react against lower side 37 when the yoke sides are in tension.

A subtending cable assembly 40 engages a U-shaped slot 41 in yoke 36 with a cable end 42 of a subtending cable 43. A subtending cable housing or sheathing 44 encloses a portion of subtending cable 43 and extends from a first reinforcing sleeve 46 engaging a tab 48 of inside holding member 32 to an actuator housing 50 including an electric drive motor 52.

Apex shift mechanism 22 includes an apex shift linkage 54 having an H-shaped first shift link 56 pivotably connected at a hinge point to a Y-shaped second shift link 58. A lower portion of first shift link 56 straddles bottom anchor 38 and has a first aperture 60 which receives lower side 37 of yoke 36. Free end of lower side 37 is removed from connecting hook 39 and passes through the aligned first aperture 60 and bottom anchor aperture to pivotably connect first shift link 56 with support member 18. An upper portion of first shift link 56 captures a lower end of second shift link 58 and has a second aperture 62 aligned with a first aperture 64 through the lower end of second shift link 58. A pin 66 passing through apertures 62 and 64 defines the hinge point or rotational joint between first and second shift links 56 and 58. The rotational joint can alternatively be provided any other suitable structure, such as a snap-in feature with a pair of engaging bumps and dimples. A reinforcing stamping 68 fixed to support member 18 includes a snap mount 70 which receives an upper pin 72 disposed between open arms of second shift link 58 for pivoting within the snap mount 70.

A cable aperture in second shift link 58 located opposite the hinge point from support member 18 receives a cable housing 78 of apex shift cable assembly 80. Cable housing 78 extends to an apex shift actuator housing 81. An apex shift cable 82 is disposed within cable housing 78 and extends beyond cable housing 78 to engage a molded cable anchor 83 fixed to support member 18 which receives a cable end 84. Molded cable anchor 83 is fixed to support member 18 at a location between bottom anchor 38 and snap mount 70 and proximate to a preformed bend 88 in support member 18 bowing outward away from apex shift linkage 58. An exposed length of cable 82 extending beyond cable housing 78 to cable end 84 is varied in length by actuator 81 with the energization of an electric drive motor 86.

The two actuator/drive motor combinations, 50, 52 and 81, 86 are mounted to the lowermost of the support fingers 27 in the embodiment shown. However, it is anticipated that the actuator/drive motor combinations could be mounted elsewhere, as may be required for the particular seat into which the lumbar support is to be placed. While electric drive motors are shown in the present embodiment, it should be appreciated that other drive means, such as hand operated cable displacement mechanisms, can be substituted.

The four-way lumbar support operates in the following manner. The four-way lumbar support 10 as shown in FIG. 3 is effectively providing no enhancement of lumbar support. Support member 18 is essentially undeflected from its unloaded shape. By displacing cable 43 to shorten the length of cable 43 disposed between the U-shaped slot 41 in yoke 36 and the cable housing 44, support member 18 bows outward, defining an outermost point, or apex 90 at the support finger 27 which is second from the top. It is understood that the precise location of apex 90 is merely exemplary and will vary with the specific design of the lumbar support 10. As the exposed cable length is shortened, second longitudinal end 26 slides along second horizontally disposed bar 16 as first longitudinal end 25 pivots about first horizontally disposed bar 14 until second horizontally disposed bar 16 is engaged by tab 48 to prevent further displacement.

The apex 90 is shifted upward and made more pronounced by shortening the length of exposed cable 82. Energization of drive motor 86 results in a shortening of the portion of apex shift cable 82 exposed between cable housing 78 and molded cable anchor 83. The change in length occurs with the pivoting of first shift link 56 relative to second shift length 58, increasing the angle therebetween and likewise increasing a distance between bottom anchor 38 and snap mount 70 which tends to straighten out a stamped or preformed bend 88.

The amount of bowing can be varied between the minimum and maximum shown in FIGS. 3 and 4 respectively by merely varying the displacement of cable 43 adjusting the exposed length of cable 43 to an intermediate length to provide the amount of bowing desired. Reversal can be achieved by reversing the change in exposed cable length. Similarly, the adjustment of the location of apex 90 can be controlled between that shown in FIGS. 4 and 5 by controlling the exposed length of cable 82. The apex 90 is shifted upward by shortening the exposed length of cable 82 . The apex is shifted downward by increasing the exposed length of cable 82.

It should be appreciated that the means for attaching the subtending cable can be varied from that shown in FIGS. 1–5. Three alternative means are shown in use with two-way lumbar supports in FIGS. 6–11.

Figure 6:
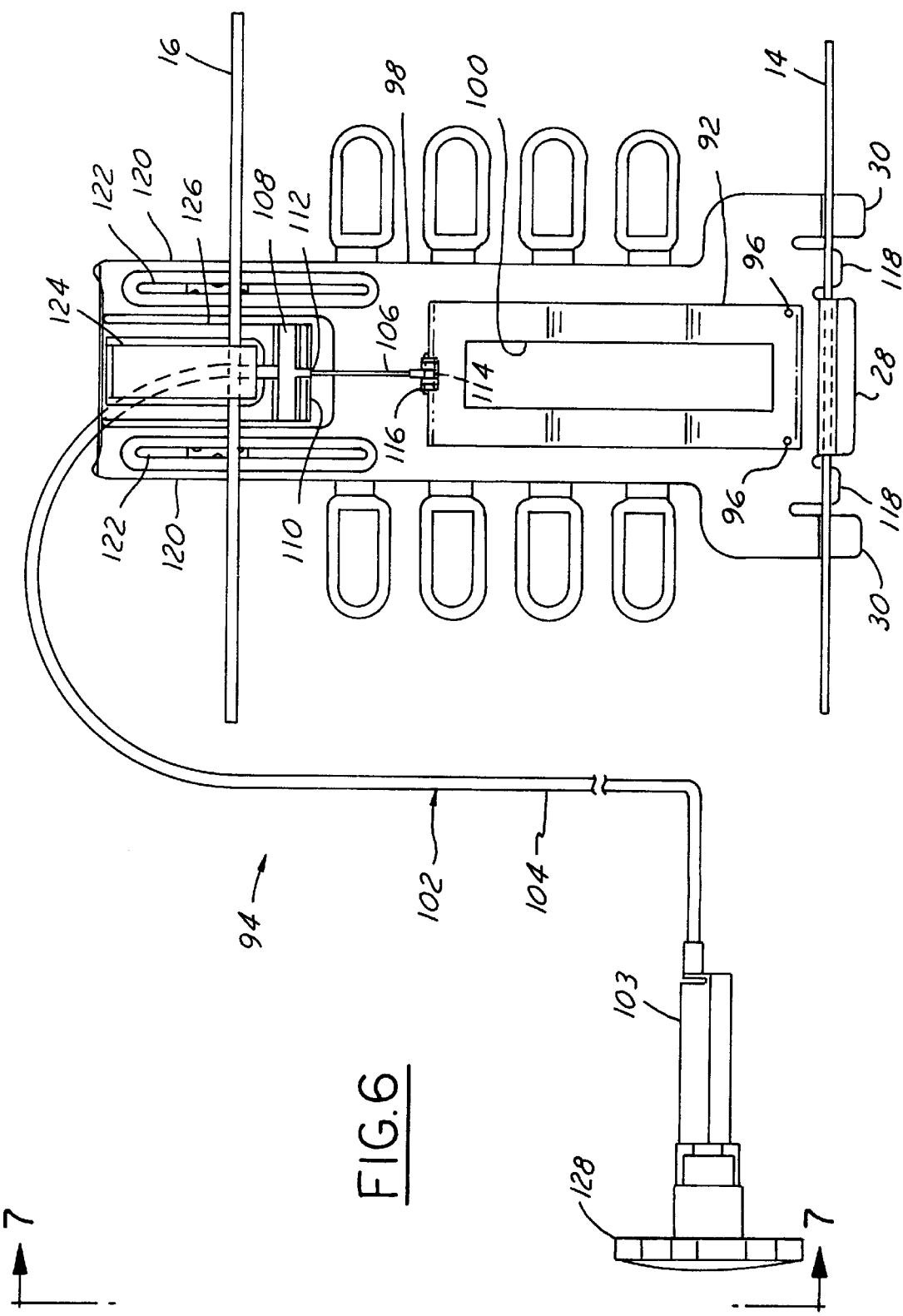
FIG. 6 is a rear view of a two-way lumbar support in a seatback frame employing a first alternative means for connecting the cable to the support member.
Figure 7:
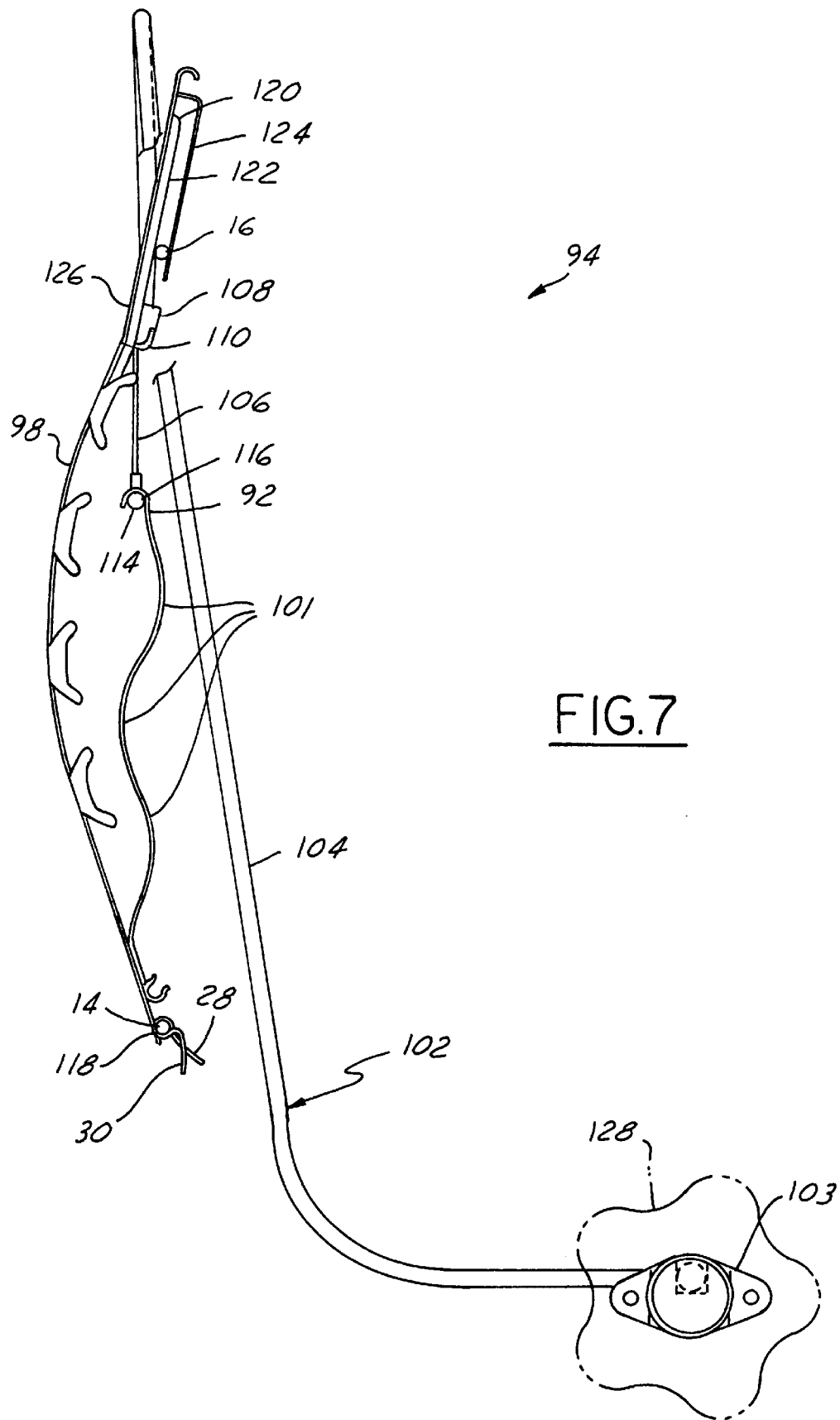
FIG. 7 is a side view of the lumbar support of FIG. 6 in the direction of arrows 7.

A first cushioning yoke 92 is shown in FIGS. 6 and 7 as an alternative to subtending yoke 36A in a two-way lumbar support 94. Cushioning yoke 92 has the shape of an elongated rectangle and is fixed at a lower end by rivets 96 to a lower end of the support member 98. Cushioning yoke 92 has a rectangular aperture 100 centered therein to accommodate installation of apex shift mechanism 22, enabling conversion of two-way lumbar support 94 to a four-way lumbar support. Cushioning yoke 92 has a plurality of wave shaped undulations 101 formed along its length. Approximately 1½ wavelengths are formed by undulations 101.

A bowden-type cable assembly 102 having an outer sleeve 104 with a cable 106 slidably disposed therein extends from a displacement mechanism 103 to support member 98. Sleeve 104 terminates in an engagement block 108 formed at an end of sleeve 104. Engagement block 108 is received by a pocket portion 110 of an upper portion of support member 98. Cable 106 passes out through engagement block 108 and a slot 112 through pocket portion 110. A portion of engagement block 108 passes through slot 112 to keep block 108 centered in pocket portion 110. An enlarged cable end 114 is received by a hook portion 116 at the top of yoke 92. As long as cable 106 is maintained in tension, engagement block 108 and cable end 114 will remain firmly seated in pocket portion 110 and hook portion 116 respectively.

The lower portion of support member 98 is pivotably attached to lower bar 14 in substantially the same manner as support member 18. The outside clamping members 30 have each been narrowed, and a pair of back-up tabs 118 have been added between the inside and outside clamping members. Back-up tabs 118 help maintain bar 14 in its desired position relative to clamping members 30 and 28.

The upper portion of support member 98 is slidably disposed over upper bar 16. The upper portion of support member 98 has a pair of outer members 120 with engaging beads 122 which stiffen outer members 120 and present a minimum contact area surface to bar 16. Retention of outer members 120 against bar 16 is ensured by a retention tongue 124 which projects rearward from the top of support member 98 a distance approximately equal to the diameter of bar 16, and then extends downward parallel to engaging beads 122, to enclose bar 16 therebetween. Pocket portion 110 is disposed at a lower end of a U-shaped section which wraps around retention tongue 124.

Displacement mechanism 103 employs a lead screw (not shown) rotatably displaced by rotation of a handwheel 128 to produce axial displacement of cable 106. It should be readily apparent that a motorized drive system can be substituted for displacement mechanism 103.

The system of FIGS. 6 and 7 operates in the following manner. Support member 98 is shown in an essentially undeflected shape in FIG. 7, providing minimal lumbar support. Handwheel 128 is rotated in a first direction to increase the amount of lumbar support provided. As cable 106 is retracted, the distance between pocket portion 110 and hook portion 116 decreases, resultantly causing support member 98 to increasingly bow outward. Coincident with this increased bowing, the upper portion moves downward, with beads 122 sliding downward on bar 16. When the desired amount of lumbar support is achieved, then handwheel 128 is released. When a decrease in lumbar support is desired, handwheel 128 is merely rotated in a direction opposite the first direction.

Although the undulations 101 in yoke 92 will tend to straighten as the apex is shifted further outward, the principle benefit of the undulations 101 is in reducing the stress on the lumbar support associated with impact loading. Impact loadings occur in rear-impact collisions. When an occupied seat is suddenly accelerated forward, as in a rear impact, the occupant is pushed back into the seat and against the lumbar support. It is highly desirable that the lumbar support maintain its functionality after sustaining an impact, yet provide some flexibility to reduce loading stresses at the pocket portion 110 and hook portion 116. The cushioning yoke achieves the objective of reducing the stresses for impact loading conditions.

Figure 8:
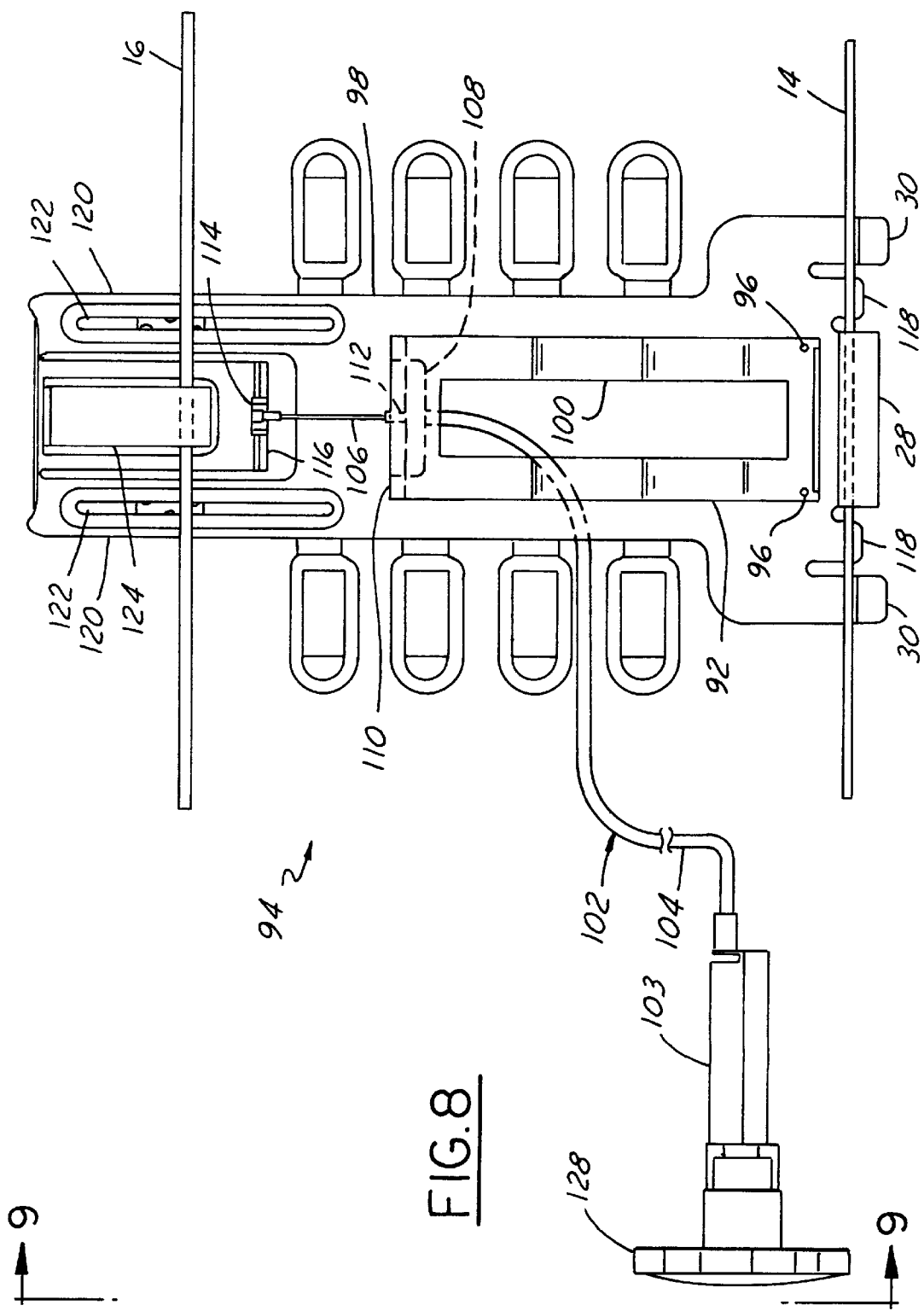
FIG. 8 is a rear view of a two-way lumbar support in a seatback frame employing a second alternative means for connecting the cable to the support member.
Figure 9:
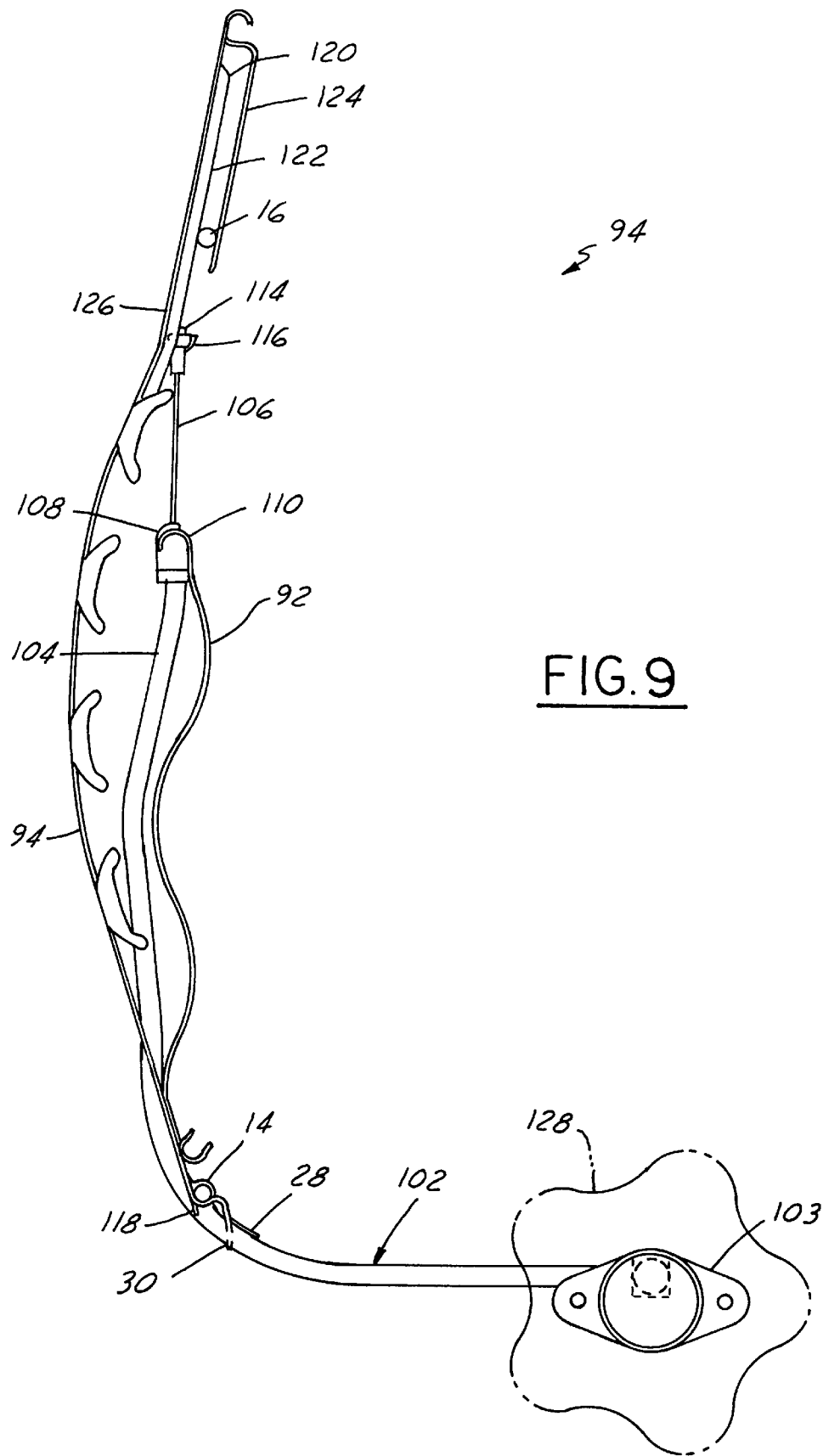
FIG. 9 is a side view of the lumbar support of FIG. 8 in the direction of arrows 9.

A second alternative means for attaching the subtending cable 102 shown in FIGS. 8 and 9 is substantially the same as that shown in FIGS. 6 and 7, except that the cable and sleeve ends, 116 and 108 respectively, and their associated retention features 110 and 116, are reversed with respect to support member 98 and yoke 92. Whether the cable sleeve is oriented to come from above, as shown in FIGS. 6 and 7, or from below, as shown in FIGS. 8 and 9, is a matter of design choice, largely controlled by packaging parameters.

Figure 10:
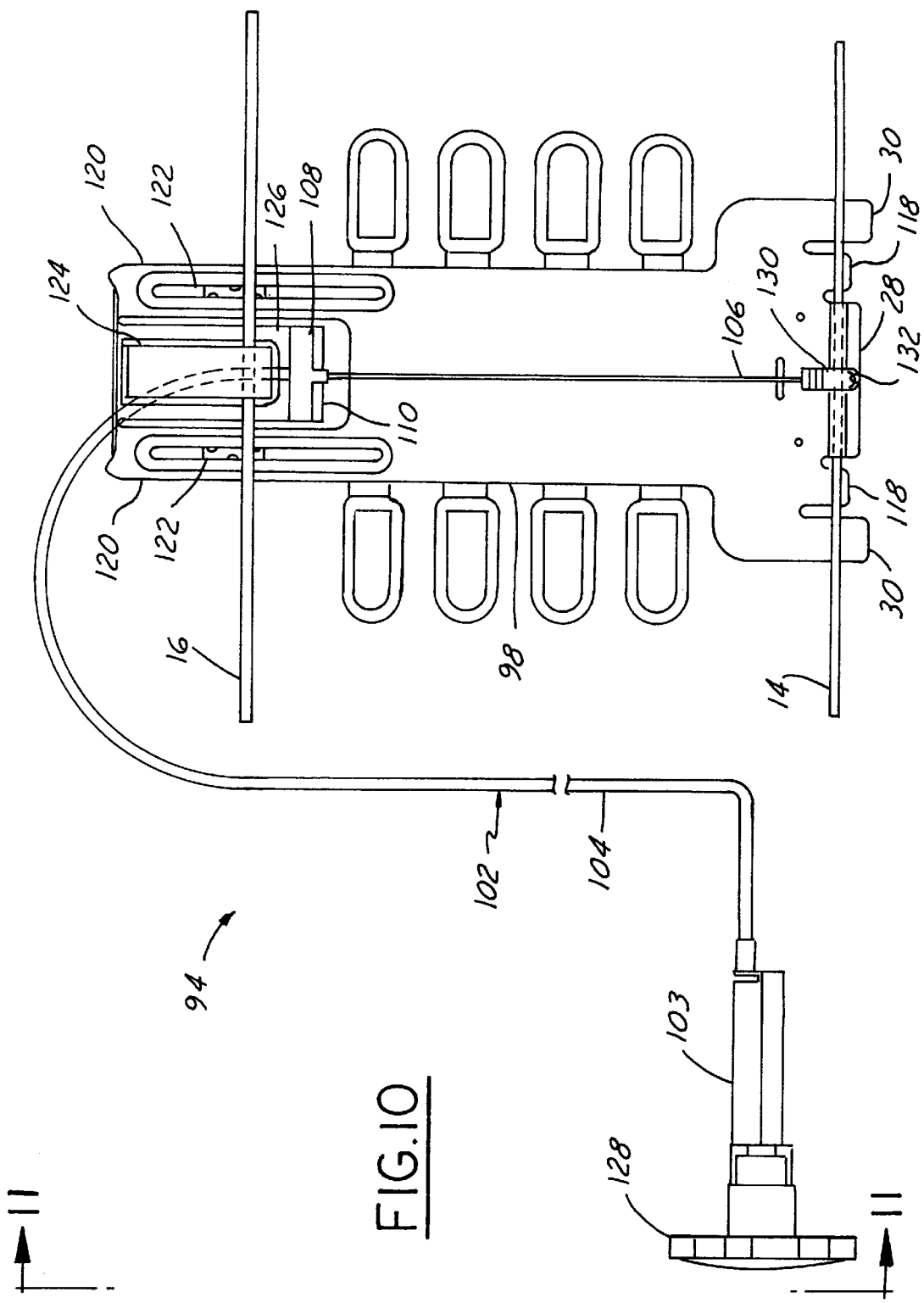
FIG. 10 is a rear view of a two-way lumbar support in a seatback frame employing a third alternative means for connecting the cable to the support member.
Figure 11:
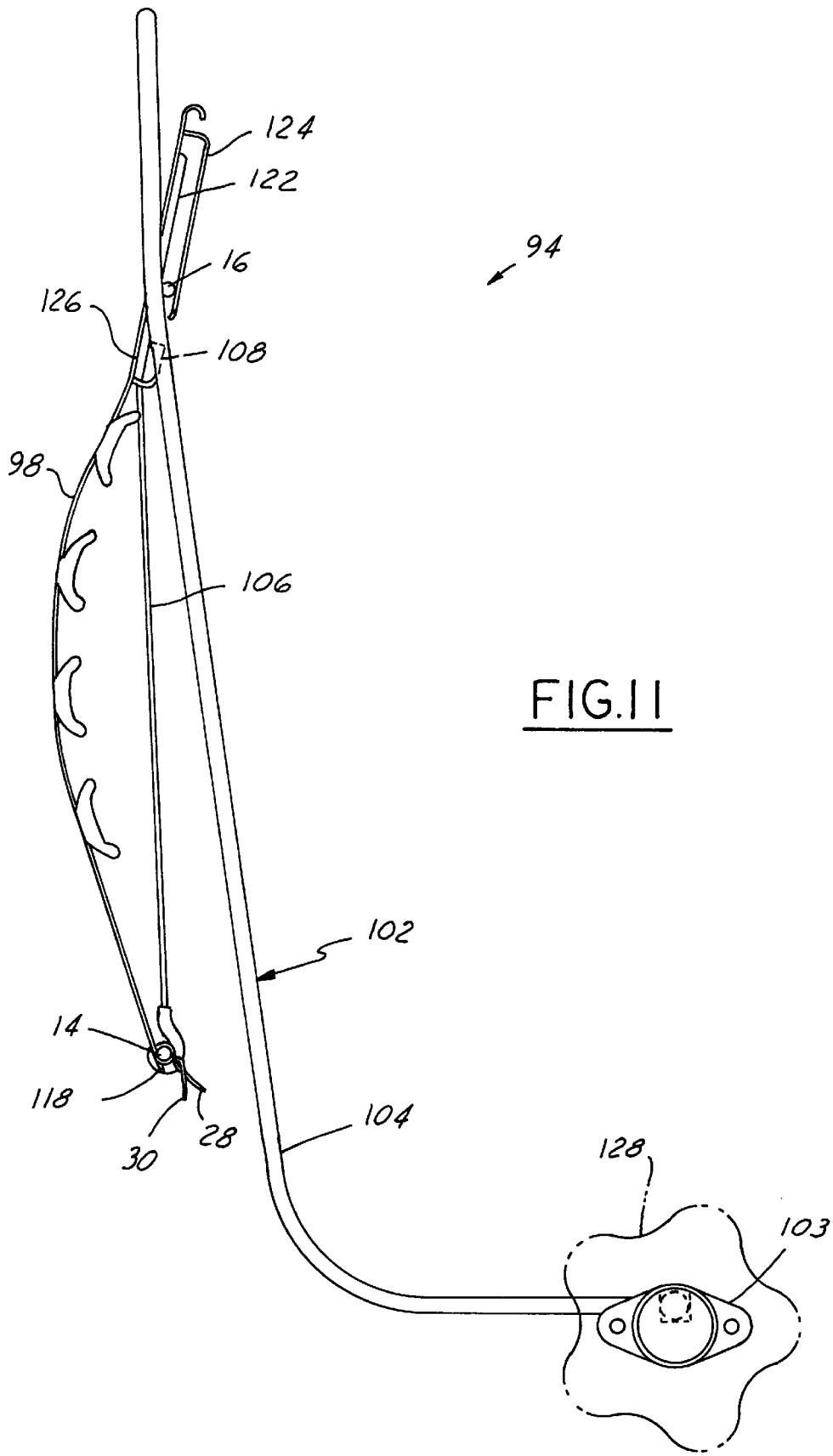
FIG. 11 is a side view of the lumbar support of FIG. 10 in the direction of arrows 11.

A third alternative means for attaching the subtending cable 102 shown in FIGS. 10 and 11 is also substantially like that shown in FIGS. 6 and 7, except that no yoke is provided. Cable 106 instead has a hook 103 which passes through a notch 132 in clamping member 28 to directly engage bar 14. While this configuration does not have the cushioning effect associated with yoke 92, it achieves an improved distribution of forces to minimize the localized stress at the point of attachment of cable 106 to support member 98. By using hook 130 to engage bar 14, the load in cable is distributed across clamping member 28 instead of a localized point.

The preceding description is exemplary rather than limiting in nature. A preferred embodiment was disclosed to enable a skilled artisan to practice the invention. Modifications are possible without departing from the scope of the present invention, which is limited only by the following claims.

We claim:

1. A lumbar support mechanism comprising:
   a flexible support member having oppositely disposed first and second longitudinal ends;
   a cushioning yoke having a first end attached to the flexible support member proximate to the first longitudinal end of the flexible support member and the cushioning yoke extending to a second end thereof disposed between the first end of the cushioning yoke and the second end of the flexible support member and the yoke having a plurality of undulations disposed between the yoke's first end and second end; and
   a cable assembly having a sleeve and a cable slidably disposed therein, the sleeve having a first end attached to either the second end of the cushioning yoke or the second end of the flexible support member and the cable having a first end attached to the other of the second end of the cushioning yoke and the second end of the flexible support member wherein the undulations tend to straighten when the flexible member is subjected to an impact loading.

2. A lumbar support mechanism as claimed in claim 1 wherein a means for longitudinally subtending the support member is disposed on the support member in alignment with an aperture in the yoke, enabling the flexible support member to shift between positions providing maximum lumbar support and minimum lumbar support without inducing contact between the means for longitudinally subtending the support member and the yoke.

3. A lumbar support mechanism as claimed in claim 1 wherein a means for longitudinally subtending the support member is disposed on the support member in alignment with an aperture in the cushioning yoke, thereby enabling the flexible support member to shift between a maximum lumbar support position and a minimum lumbar support position without inducing contact between the yoke and the means for longitudinally subtending the support member.

4. A lumbar support mechanism as claimed in claim 1 wherein the first end of the sleeve is attached to the second end of the cushioning yoke and the first end of the cable is attached to the second end of the flexible support member.

5. A lumbar support mechanism as claimed in claim 1 wherein the first end of the sleeve is attached to the second end of the flexible support member and the first end of the cable is attached to the second end of the cushioning yoke.

6. A lumbar support mechanism comprising:
   a flexible support member having oppositely disposed first and second longitudinal ends, the first longitudinal end having clamping features adapted to rotatably attach the first longitudinal end to a first horizontally disposed bar and the second longitudinal end having slidable connecting features adapted to be slidably connected to a second bar having a horizontally disposed major axis; and
   a cable assembly having a sleeve and a cable slidably disposed therein, a first end of the cable having an engaging feature fixed thereto, the engaging feature being adapted to engage the first bar, the sleeve having a first end connected to the second end of the flexible support member wherein displacement of the cable within the sleeve causes the flexible support member to arch responsively thereto.

7. A lumbar support mechanism comprising:
   a substantially planar flexible support member having oppositely disposed first and second longitudinal ends;
   a yoke having a first end attached to the flexible support member proximate to the first longitudinal end of the flexible support member and the yoke having a second end disposed between the first end of the yoke and the second end of the flexible support member and the yoke having an aperture extending between the first end and the second end thereof, and wherein the yoke has a plurality of undulations disposed between the yoke's first end and second end and wherein the undulations tend to straighten when the flexible support member is subject to impact loading;

a cable assembly having a sleeve and a cable slidably disposed therein, the sleeve having a first end attached to either the second end of the yoke or the second end of the flexible support member and the cable having a first end attached to the other of the second end of the cushioning yoke and the second end of the flexible support members, and wherein movement of the cable defines an apex formed in the flexible support member between the flexible support member's first and second longitudinal ends; and an apex shift mechanism disposed on the support member in alignment with the aperture in the yoke, thereby enabling the location of the apex to be shifted without inducing contact between the yoke and the apex shift mechanism.

* * * * *

UNITED STATES PATENT AND TRADEMARK OFFICE
CERTIFICATE OF CORRECTION

PATENT NO. : 5,984,407
DATED : November 16, 1999
INVENTOR(S) : Ligon, Sr.

It is certified that error appears in the above-identified patent and that said Letters Patent is hereby corrected as shown below:

Claim 7, column 8, line 1, delete "members" and insert --member--

Signed and Sealed this

Fourth Day of July, 2000

Attest:

Attesting Officer

Q. TODD DICKINSON
Director of Patents and Trademarks